(12) United States Patent
Peterson et al.

(10) Patent No.: US 8,457,437 B2
(45) Date of Patent: Jun. 4, 2013

(54) SYSTEM AND METHOD FOR ENHANCING REGISTERED IMAGES USING EDGE OVERLAYS

(75) Inventors: Kevin A. Peterson, Richardson, TX (US); John J. Coogan, Bedford, TX (US)

(73) Assignee: Raytheon Company, Waltham, MA (US)

( * ) Notice: Subject to any disclaimer, the term of this patent is extended or adjusted under 35 U.S.C. 154(b) by 569 days.

(21) Appl. No.: 12/729,822

(22) Filed: Mar. 23, 2010

(65) Prior Publication Data

US 2011/0235939 A1    Sep. 29, 2011

(51) Int. Cl.
G06K 9/40    (2006.01)
G06K 9/32    (2006.01)

(52) U.S. Cl.
USPC ........................................... 382/266; 382/294

(58) Field of Classification Search
USPC ........................................... 382/266, 284, 294
See application file for complete search history.

(56) References Cited

U.S. PATENT DOCUMENTS

| | | | | |
|---|---|---|---|---|
| 4,782,399 A | * | 11/1988 | Sato | 358/443 |
| 4,873,577 A | * | 10/1989 | Chamzas | 382/240 |
| 5,949,914 A | * | 9/1999 | Yuen | 382/254 |
| 5,974,165 A | * | 10/1999 | Giger et al. | 382/132 |
| 7,620,223 B2 | * | 11/2009 | Xu et al. | 382/128 |
| 7,912,247 B2 | * | 3/2011 | Williams et al. | 382/103 |
| 2003/0081821 A1 | * | 5/2003 | Mertelmeier et al. | 382/131 |
| 2004/0114796 A1 | * | 6/2004 | Kaku | 382/165 |
| 2005/0220355 A1 | * | 10/2005 | Sun et al. | 382/254 |
| 2006/0187305 A1 | * | 8/2006 | Trivedi et al. | 348/169 |
| 2007/0291170 A1 | * | 12/2007 | Han et al. | 348/458 |
| 2008/0130950 A1 | * | 6/2008 | Miklos et al. | 382/103 |
| 2008/0267533 A1 | * | 10/2008 | Ida et al. | 382/299 |
| 2009/0046902 A1 | * | 2/2009 | Williams et al. | 382/119 |
| 2009/0148034 A1 | * | 6/2009 | Higaki et al. | 382/153 |
| 2009/0318815 A1 | * | 12/2009 | Barnes et al. | 600/473 |
| 2011/0211749 A1 | * | 9/2011 | Tan et al. | 382/154 |

OTHER PUBLICATIONS

David Prewer and Les Kitchen, "A Fast Table-Driven Method for Edge Thinning and Linking" PSU,1999, pp. 1-5.

* cited by examiner

Primary Examiner — John Strege
(74) Attorney, Agent, or Firm — Cantor Colburn LLP

(57) ABSTRACT

The system relates to a method for enhancing an image by extracting edge points from a corresponding image and overlaying the edge points on the image to be enhanced. In one aspect of the method, the first image is of a lower resolution than the second image. The method also contemplates enhancing an image taken with a first modality with a second image taken with another modality.

13 Claims, 5 Drawing Sheets

|   | 0 | 1 | 2 | 3 | 4 | 5 | 6 | 7 | 8 |
|---|---|---|---|---|---|---|---|---|---|
| 0 |   |   | 2 |   |   |   |   | 23 |   |
| 1 | 23 | 12 |   |   | 234 |   |   |   | 1 |
| 2 | 1 |   |   | 345 |   | 243 |   |   | 4 |
| 3 |   |   | 234 |   |   |   | 342 |   |   |
| 4 |   | 263 |   |   | 120 |   |   | 243 |   |
| 5 |   |   | 342 |   |   |   | 153 |   |   |
| 6 | 13 |   |   | 367 |   | 322 |   |   | 45 |
| 7 |   | 12 |   |   | 345 |   |   | 4 |   |
| 8 |   |   | 123 |   |   |   | 12 |   |   |

5a — Cell(6,5)

|   | 0 | 1 | 2 | 3 | 4 | 5 | 6 | 7 | 8 |
|---|---|---|---|---|---|---|---|---|---|
| 0 |   |   | 2 |   |   |   |   | 23 |   |
| 1 | 23 | 12 |   |   | 234 |   |   |   | 1 |
| 2 | 1 |   |   | 345 |   | 243 |   |   | 4 |
| 3 |   |   | 234 |   |   |   | 342 |   |   |
| 4 |   | 263 |   |   | 120 |   |   | 243 |   |
| 5 |   |   | 342 |   |   |   | 153 |   |   |
| 6 | 13 |   |   | 367 |   | 322 |   |   | 45 |
| 7 |   | 12 |   |   | 345 |   |   | 4 |   |
| 8 |   |   | 123 |   |   |   | 12 |   |   |

5b — Cell(6,5)

16   16

SYSTEM AND METHOD FOR ENHANCING REGISTERED IMAGES USING EDGE OVERLAYS

STATEMENT OF GOVERNMENT INTEREST

This invention was made with Government support under Contract No.: 2004-K7124300-000 awarded by the Department of Defense (DOD). The Government has certain rights in this invention.

TECHNICAL FIELD

This disclosure relates to a system and method for image enhancing using edge overlays. More specifically, this disclosure relates to a system and method for enhancing a low-resolution image using edge overlays extracted from a high-resolution image.

BACKGROUND OF THE INVENTION

A wide variety of surveillance and imaging technologies depend upon techniques that fuse data from multiple sensors. Using these techniques, pieces of information from various sources can be combined into a single image containing the important information from all sensors. For instance, infrared imagery can be combined with visible imagery to create an improved image.

One basic data fusion technique is "Pan Sharpening" wherein a panchromatic image with a fine spatial resolution or low ground sample distance (GSD) is combined with a second image having a larger GSD. An example of a system implementing such technique is disclosed in U.S. Pat. No. 5,949,914 to Yuen.

Systems using "Pan sharpening" techniques employ a single band (gray scale) panchromatic image and multi-band spectral image (i.e. a color image). However, these "Pan sharpening" techniques generally are known to introduce artifacts from the sharpening image into the sharpened result.

Other methods and systems currently utilized in the industry for processing images by way of sharpening one image with another image have also exhibited a side effect of introducing artifacts from the sharpening process. In turn, these artifacts lead to users or viewers of the sharpened image confusing the artifact as actual data from the original image.

Hence, there exists a need in the industry to overcome these problems and provide a method and system for enhancing the sharpness of images without introducing unwanted artifacts into the enhanced image. Accordingly, there exists a need to concurrently display information from both a low-resolution image and a high-resolution image without modifying any pixel values in the image to be enhanced. There also exists a need to leave the original image to be enhanced intact, preserving the original data without modification, while overlaying enhancing data from a second image so to preserve the original image while displaying the enhancing data as an overlay to provide enhanced context.

SUMMARY OF THE INVENTION

According to one embodiment of the present disclosure, a system is disclosed which implements an automated method for enhancing an image without modifying the image to be enhanced. In one aspect of the method, the image is enhanced by extracting edge points from a corresponding image and overlaying the extracted edge points onto corresponding locations in the image to be enhanced. In another aspect of the method, the corresponding image is of a higher resolution than the image to be enhanced.

An advantage is the ability to fuse non-aligned images in a way that does not introduce any artifacts into the result by mapping corresponding points between the two images to one another, and extracting edge information from one image to overlay on the other image.

Another advantage is to allow an adjustment to the number of edge points overlaid on the first image based upon the intensity of those edge points in the second image.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 4 is an illustration of a low-resolution image and a high-resolution image from a pixel and sub-pixel standpoint in accordance with the teachings of the present disclosure.

FIG. 5 is an illustration of edge points detected in an image in accordance with the teachings of the present disclosure.

DETAILED DESCRIPTION OF THE DRAWINGS

The disclosed system relates to a system and method for enhancing an image using edge overlays. In one aspect of the disclosure, details from a high-resolution image are overlaid on top of a similar low-resolution image. Details regarding the system and associated method are discussed below.

Figure 1:
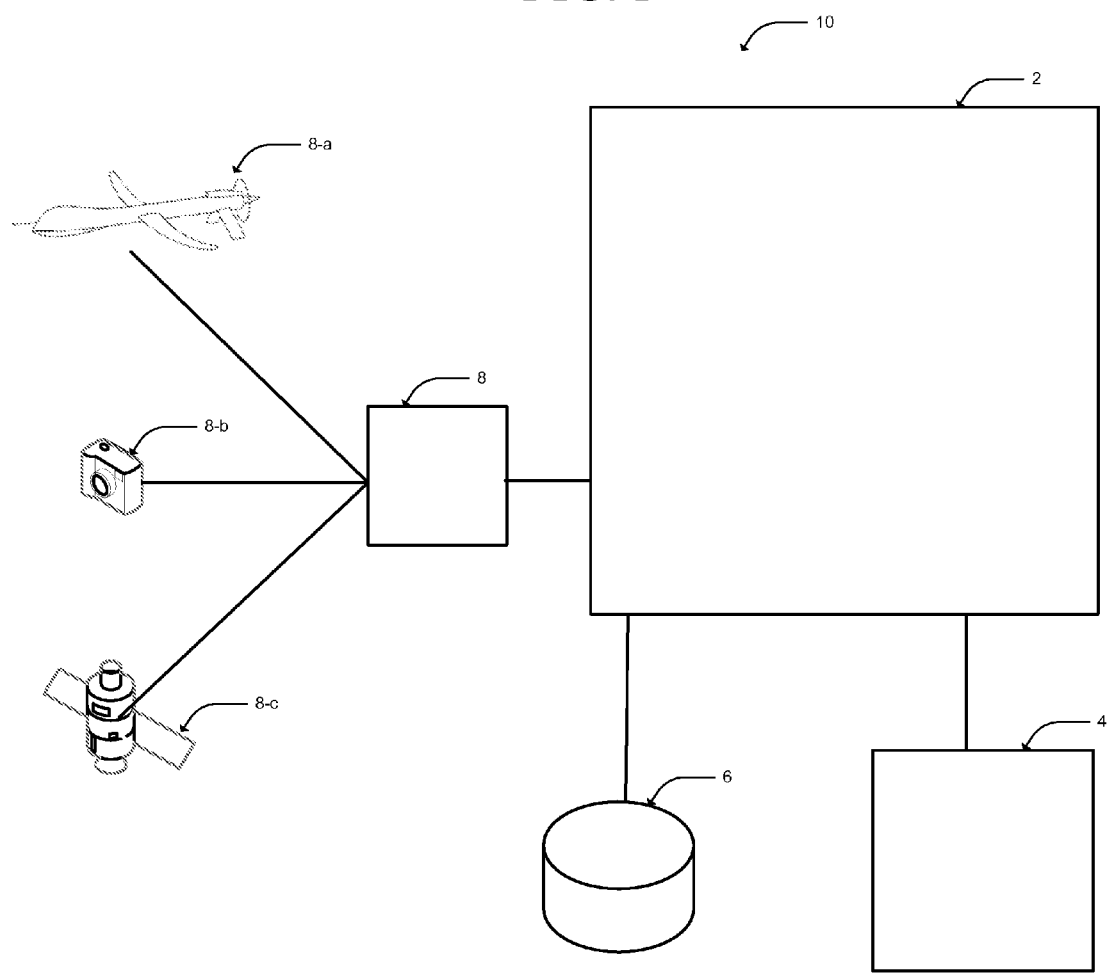
FIG. 1 is a block diagram illustrating one embodiment of a system within which the enhancing of images using edge overlays may be implemented in accordance with the teachings of the present disclosure.

One embodiment of a system within which the enhancing of images using edge overlays may be implemented in accordance with the teachings of the present disclosure is illustrated in FIG. 1. The system 10 comprises a processing unit 2, a memory 4, a high-resolution image data store 6, and a low-resolution image source 8.

The system 10 can be implemented on one or more computing systems, which can include a personal computer, a workstation, a network computer, hand held device, or any other suitable processing device. Further, the system 10 can be written as a software program in any appropriate computer language, such as, for example, C, C++, C#, Java, Assembler, Tcl, Lisp, Javascript, or any other suitable language.

The processing unit 2 can be any computer processing unit, and could be a single central processing unit, or a number of processing units configured to operate either in sequence or in parallel. The processing unit 2 can be configured to execute software processes which implement the steps disclosed herein.

The memory 4 is any computer memory capable of storing the steps necessary for the processing unit 2 to implement the steps disclosed herein. The memory 4 may be in the form of memory resident within the processing unit or in the form of standalone memory coupled to the processing unit via a communication path, such as a bus or a network. The high-resolution image data store 6 can be any system for storing data, such as a database, a filesystem, a hard drive, or a flash drive, and likewise, may also be resident or remotely coupled via a network.

The low-resolution image source 8 can be any image source in communication with the processing unit 2. Depicted by way of example in FIG. 1, the low-resolution image source 8 could be an Unmanned Aerial Vehicle 8-a equipped with imaging components, a camera 8-b, or a satellite 8-c capable of capturing imaging data. The low-resolution image source 8 could also be a data store, such as a database, or filesystem, which contains imaging data. As would be evident to one of skill in the art, the low-resolution image source 8 may also be in the form of the same datastore as the high-resolution image datastore 6.

Figure 2:
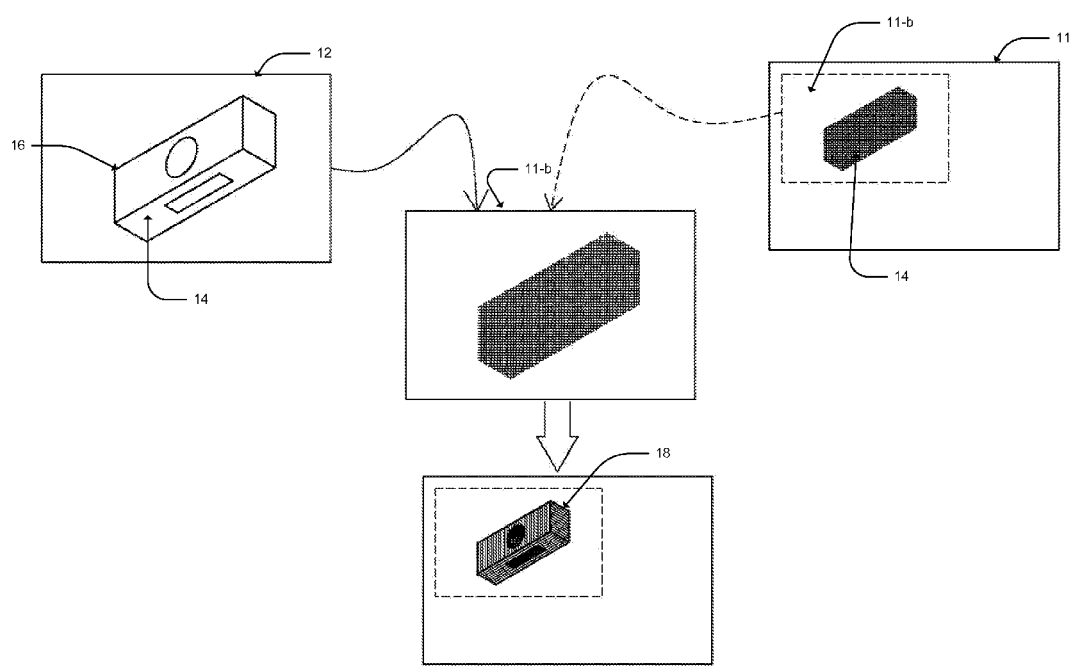
FIG. 2 is an illustration of a low-resolution image being enhanced using edge overlays from a high-resolution image within the system of FIG. 1.

Turning to FIG. 2, the system 10 enhances an area 11-b of a low resolution image 11 by identifying edge points 16 in a high-resolution image 12. These edge points 16 correspond to an object 14 which is found in both the low-resolution image 11 and high-resolution image 12. Once the edge points 16 are identified, they can be overlaid on top of the low-resolution image 11, forming an enhanced image 18.

The term low-resolution image and high-resolution image can refer to the pixel count of the respective images (wherein a low-resolution image has a lower pixel count than the high resolution image). The terms low-resolution image and high-resolution image can also refer to images collected by different image collection modalities. For instance, the low-resolution image 11 can be collected from a long wave infrared (LWIR) image and enhanced using edge information from a high-resolution image 12 captured using visible near infrared (VNIR). In such a situation, the two sensors (LWIR and VNIR) measure fundamentally different properties. Namely, VNIR collects the reflectivity of the surface, while LWIR measures the surface emissivity and temperature. By extracting edge information from the high-resolution VNIR modality, and overlaying that on top of the low-resolution LWIR modality, the features of each band remain distinct and a more complete picture can be displayed.

In another example, the low-resolution image 11 and high-resolution image 12 can be taken with the same modality, but under different conditions. For instance, the low-resolution image 11 to be enhanced may be taken from a camera on one day. There may be a need to enhance that image with a picture taken by the same camera a few days later under differing circumstances (e.g. a brighter/sunnier day) or geometry. Thus, the high-resolution image 12 could be the picture taken by the camera on a different day.

As would be evident to one of skill in the art, the images 11 and 12 can be in the form of any image capable of being analyzed by a computing system, including panchromatic images (images collected in the broad visual wavelength range, but rendered in black and white), multispectral images (images optically acquired in more than one spectral or wavelength interval), grayscale images (images in which the value of each pixel is a single sample), infrared images (images collected using infrared radiation), RADAR, or any other image.

Importantly, edge information from both the low-resolution image 11 and high-resolution image 12 is utilized in enhancing the low-resolution image 11. Thus, the enhancing technique does not lose any information contained in either of the images.

Figure 3:
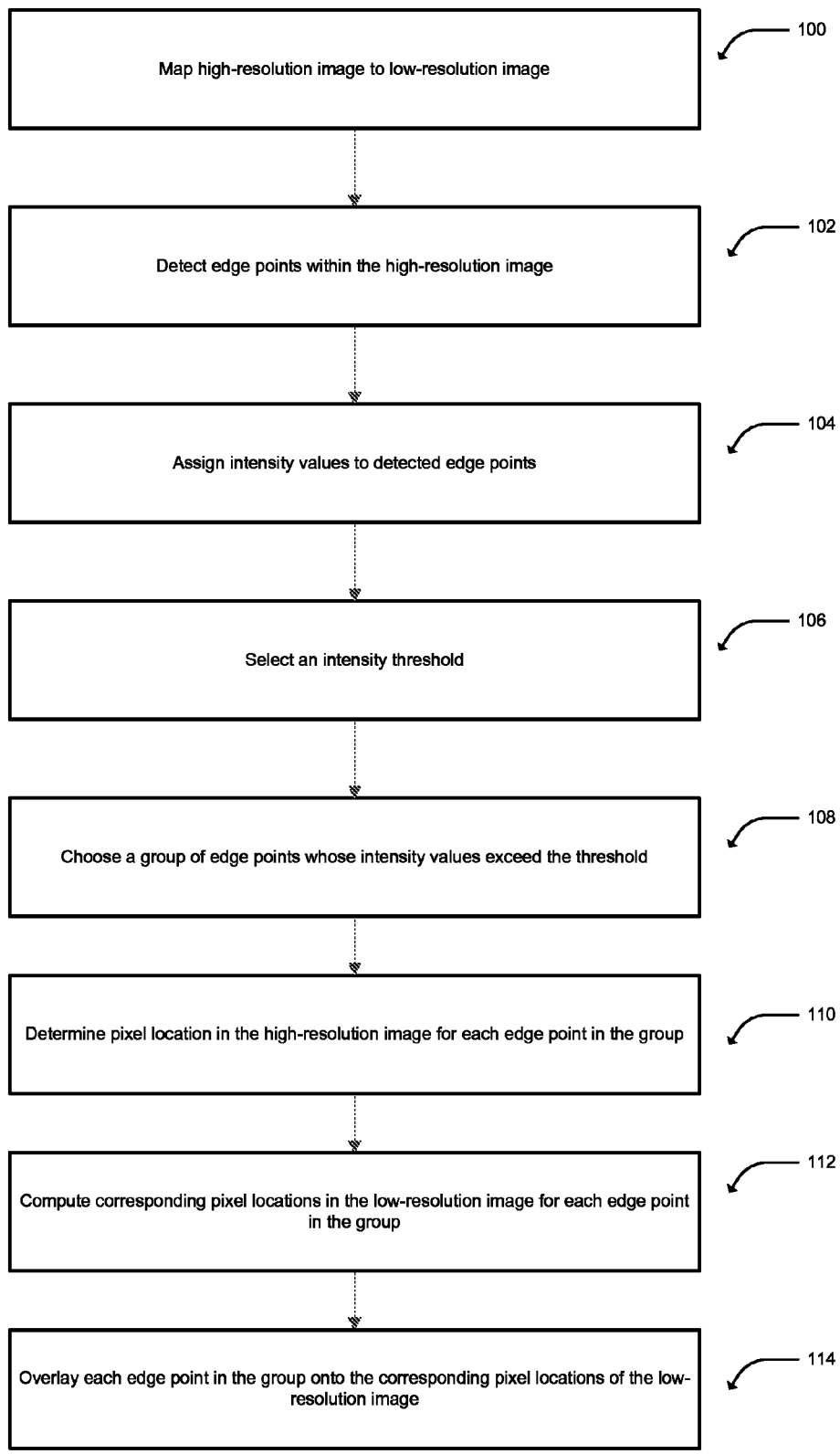
FIG. 3 is a flow chart illustrating one embodiment of the steps that may be performed by the system of FIG. 1.

In now referring to FIG. 3, one embodiment of the steps that may be performed by the system 10 for achieving image enhancing using edge overlays can be seen in accordance with the teachings of the present disclosure. As shown in FIG. 3, the system 10 begins at step 100 by mapping the high-resolution image 12 to the low-resolution image 11. This can be accomplished through image registration, a process which involves transforming data from different sets into a single coordinate system. Image registration is a preprocessing task in image processing which fuses information from multiple images or multiple modalities of imaging. In a preferred embodiment, the system 10 herein can fuse a high-resolution image 12 with a low-resolution image 11, utilizing an image registration algorithm capable of sub-pixel registration, as explained below in connection with FIG. 4.

Figure 4:
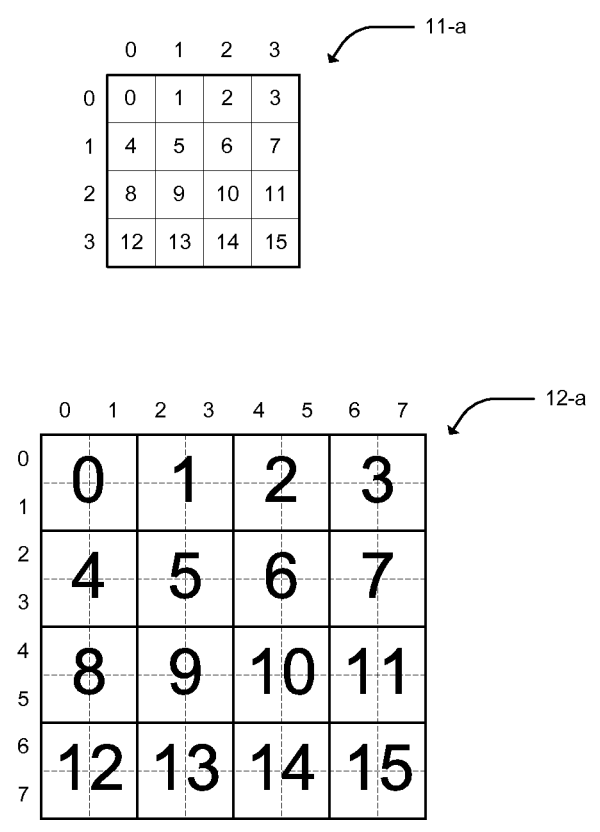

FIG. 4 depicts two sample images, a 4×4 low-resolution image 11-a, and an 8×8 high-resolution image 12-a. As would be evident to one of skill in the art, it is not a requirement that the low-resolution image 11-a and high-resolution image 12-a have the same aspect ratio. The numerals 0 through 15 are depicted in both the low-resolution image 11-a and high-resolution image 12-a. As can be seen, the single cell (or pixel) represented in the low-resolution image 11-a at cell (0,0), depicting the numeral "0" corresponds to the 4 cells (or pixels) represented in the high-resolution image 12a at cells (0,0), (0, 1), (1, 0), and (1,1), also depicting the numeral "0". Thus, when performing image registration on these two images 11-a and 12-a, it would be beneficial to perform sub-pixel image registration, where the pixels in the high-resolution image 12-a can be mapped to fractions of pixels in the low-resolution image 11-a. Thus, each pixel in the high-resolution image 12-a will have a corresponding subpixel (or fraction of a pixel) in the low-resolution image 11-a. It should also be noted here that the system 10 can also be used with images of the same resolution whereby subpixel registration may not be necessary.

Returning to FIG. 3, the system 10 next detects one or more edge points 16 in the high-resolution image 12 at step 102. Preferably, edge detection is performed with an algorithm capable of thinning the edge. For instance, in one embodiment, the algorithm disclosed in "A Fast Table-Driven Method for Edge Thinning and Linking," by David Prewer & Les Kitchen can be used. During this process of edge detection, the system 10 identifies points in the high-resolution image 12 at which the brightness changes, or has discontinuities. Through this process, the system 10 may determine the boundaries of objects 14 (see FIG. 2) in an image.

However, it should be noted that it is not necessary for the entirety of an edge of an object to be detected for the system 10 to operate properly. FIG. 5, consisting of FIGS. 5a and 5b, discloses an example of edge points 16 detected in a 9×9 image, which could correspond to the high-resolution image 12 (as seen in FIG. 2). The numbers in each of the cells in FIGS. 5a and 5b represent edge intensities. FIG. 5b depicts a table having edge points 16 whose values are higher than 160 (and as further discussed below) displayed in boldface. (Note that each of the numerals in 5a and 5b represent edge points 16.) As can be seen, the point at cell (6, 5) with an intensity of 153 is not bold face, but the remaining edge points 16 indicating an object edge have been identified, thus depicting an edge of the object in the image.

As would be evident to one of skill in the art, the edge detection step can happen at the same time (in parallel) with the image registration step. Both steps can be performed on the same computer, or on separate computers. As mentioned above, once the edge points 16 have been identified, the system 10 may assign intensity attributes to those edge points 16 as shown at step 104. In alternative embodiments, this step may be combined with the edge detection step.

In determining intensity, the system 10 may rank the detected edge points 16 based upon any intensity criteria. For instance, the system 10 may rank the edge points 16 based strength of contrast. Additionally, other commonly known image intensity criteria could also be employed to accomplish detecting the edge points 16 and determining intensity.

Once intensity values have been determined for each of the edge points 16, an intensity threshold is determined at step 106. In one embodiment, the entire range of intensity values may be divided into categories. For instance, edge points 16 whose values are 90-100% of the maximum edge point intensity would be in 1 category, those whose values are 80-89% of the maximum in a second category, and so forth. Any other system of categorization of intensity values would work within the teachings of the present disclosure.

The intensity threshold is utilized for determining which edge points 16 are to be overlaid on the lower-resolution image 11. The system 10 can use a preselected intensity threshold, or allow for selection of the intensity threshold later. In one embodiment, the system 10 provides a sliding scale, permitting a user to dynamically select an intensity threshold while at the same time seeing how many edge points 16 are captured with the selected threshold. Thus, a user may increase the threshold to reduce the number of edge points 16 that will be overlaid (and thus eliminate "noise," that is to say edge points 16 that may not be helpful in enhancing the low-resolution image 11 (see FIG. 2)). As discussed below, these steps 106 through 114 can be performed essentially simultaneously, so that the edges are overlaid on top of the low-resolution image 11 as the intensity threshold is selected.

Returning to the flow chart in FIG. 3 at step 108, once an intensity threshold is selected, the system 10 selects those edge points 16 whose intensity value satisfies the intensity threshold. Next, the system 10 determines the respective pixel location of the selected edge points 16 at step 110. This enables the system 10 to know where in the high-resolution image 12 the particular edge point 16 (which has been selected) is located. Using this information, at step 112, the system 10 computes a corresponding location in the low-resolution image 11 for the selected edge point. To accomplish this, the system 10 utilizes the mapping between the low-resolution image 11 and high-resolution image 12 determined in step 100. As discussed above in connection with FIG. 4, this mapping associates each pixel in the high-resolution image 12 with a pixel or subpixel (fraction of a pixel) in the low-resolution image 11. (See the mapping of cell (0,0) in low-resolution image 11-a of FIG. 4 to cells (0,0), (0,1), (1,0), and (1,1) of high-resolution image 12-a)).

At step 114, the system 10 then overlays the selected edge points 16 from the high-resolution image 12 on top of the low-resolution image 11. The result is that the low-resolution image 11 is enhanced based upon the edge information extracted from the high-resolution image 12 to result in the enhanced image 18 as seen in FIG. 2.

A variety of image formats can be used for both the low-resolution image 11 and high-resolution image 12, including National Imagery Transmission Format (NITF) and Joint Photographic Experts Group (MPEG) format. Additionally, in a preferred embodiment, the edge points 16 are presented as an additional layer on top of the low-resolution image 11. Thus, the low-resolution image 11 is not modified, other than to display an additional layer. The resulting enhanced image 18 can also be saved or further manipulated according to the disclosed method. For instance, another area similar to 11-b in the low resolution image 11 could be identified for enhancing.

The foregoing has described the present disclosure for a preferred embodiment. The disclosure is also intended to be applied to numerous other techniques. For instance, current techniques for PAN sharpening are useful for a narrow range of fused imagery, and were built to address the fusion of coarse resolution multispectral imagery (MSI—usually 3 or 4 bands of data) and a finer resolution single PAN band. The present disclosure allows enhancement of the coarse resolution spectral image with a fine resolution PAN band without mixing information from the different images, as one image remains unchanged while information from the other image is converted to an edge map, which is then overlaid on the first image.

For example, in a PAN sharpening system, a 4 band MSI image may be enhanced by overlaying a sharpening band on the MSI image without making any changes to the color. The present disclosure may accomplish this while still preserving the spectral information within the MSI image.

In another example, thermal IR images are often collected at coarser GSD and benefit from fusion with a finer resolution PAN. The IR image (LWIR or MWIR, for instance) is a single band grey image. Mixing information from a second grey level image (the fine resolution PAN band) produces a new grey level, and the observer cannot tell whether a pixel's grey level is due to a dark region in the PAN or IR. Additionally, the information in the two bands is fundamentally different. The IR band is measuring infrared radiance, which depends on temperature and emissivity. The PAN band measurement depends on visible reflection. Thus, enhancing the IR band with the PAN band highlights different features while preserving the information contained in both data sources.

The same disclosure can be applied to enhancing hyperspectral images (HSI) and polarimetric images (PI). The many banded focal planes used to create HSI operate with coarser GSDs, so there is tremendous benefit in fusing such data with a finer GSD band. Enhancing HSI or PI images according to the present disclosure preserves the unique character of these images while providing context through an edge display that may be turned off or on, thinned out, displayed as dots in a color chosen not to interfere with the interpretation of the HSI or PI data, or any other manner.

The present disclosure may also enhance different images with similar or identical GSDs. An edge overlay allows an observer to compare edges in one band to another, again without needing to modify the data in either band.

The present disclosure may also enhance a hard to interpret image, such as a RADAR image (including synthetic aperture radar (SAR)). These RADAR images are collected with very fine GSD, but the underlying phenomenology which produces the image is complex, resulting in difficult to interpret images. Using edge overlays as described herein, interpretation of these complex images is simplified by the use of edge overlays which add context to the image.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for enhancing the edges of an object depicted within an image, the method comprising:
   identifying a low resolution image depicting at least one object of interest and further identifying a high resolution image that corresponds to the low resolution image;

registering the high and low resolution images using a registration algorithm, whereby points in the high resolution image are mapped to points in the low resolution image;

detecting edge points within the high resolution image using an edge detection algorithm, the edge points corresponding to the edges of objects depicted within the high resolution image;

categorizing the detected edge points into groups on the basis of the intensity of the edge points, and selecting a group of edge points;

overlaying the selected group of edge points onto the objects of interest in the low resolution image, the overlay being carried out on the basis of the registration, whereby the edges of the objects of interest are enhanced.

2. The method of claim 1 wherein the registration algorithm is capable of sub-pixel registration.

3. The method of claim 1 wherein the low resolution image is collected by a first imaging modality and the high resolution image is collected by a second imaging modality.

4. The method of claim 3 wherein the first imaging modality is the same as the second imaging modality.

5. The method of claim 1 wherein the low resolution image is selected from the group consisting of panchromatic, grayscale, infrared, multi spectral, hyperspectral, radar, and polarimetric images.

6. A system for enhancing the edges of an object depicted within an image, the system comprising:
a high resolution data store;
a low-resolution data source;
a memory; and
a processing unit interconnected to the data store, data source, and memory and configured to:
identify a low resolution image depicting at least one object of interest and further identifying a high resolution image that corresponds to the low resolution image;
register the high and low resolution images using a registration algorithm, whereby points in the high resolution image are mapped to points in the low resolution image;
detect edge points within the high resolution image using an edge detection algorithm, the edge points corresponding to the edges of objects depicted within the high resolution image;
categorize the detected edge points into groups on the basis of the intensity of the edge points, and selecting a group of edge points; and
overlay the selected group of edge points onto the objects of interest in the low resolution image, the overlay being carried out on the basis of the registration, whereby the edges of the objects of interest are enhanced.

7. The system of claim 6 wherein the registration algorithm is capable of sub-pixel registration.

8. The system of claim 6 wherein the low resolution image is collected by a first imaging modality and the high resolution image is collected by a second imaging modality.

9. The system of claim 8 wherein the first imaging modality is the same as the second imaging modality.

10. The system of claim 6 wherein the low resolution image is selected from the group consisting of panchromatic, grayscale, infrared, multi spectral, hyperspectral, radar, and polarimetric images.

11. The system of claim 6 wherein the high resolution data store is a database.

12. The system of claim 6 wherein the low resolution data source is a database.

13. The system of claim 6 wherein the low resolution data source is a camera.

* * * * *